United States Patent [19]

Hiwatashi et al.

[11] Patent Number: 5,103,396
[45] Date of Patent: Apr. 7, 1992

[54] SYSTEM FOR CONTROLLING ACTIVE SUSPENSIONS OF A VEHICLE

[75] Inventors: Yutaka Hiwatashi; Atsushi Mine, both of Gunma; Katsuyoshi Kamimura, Tochigi, all of Japan

[73] Assignee: Fuji Jukogyo Kabushiki Kaisha, Tokyo, Japan

[21] Appl. No.: 519,142

[22] Filed: May 4, 1990

[30] Foreign Application Priority Data

May 15, 1989 [JP] Japan .................................. 1-121278

[51] Int. Cl.⁵ .................... B60G 11/26; B60G 17/015; B60G 17/056
[52] U.S. Cl. .............................. 364/424.05; 280/707; 280/DIG. 1
[58] Field of Search .................... 364/424.05; 280/707, 280/708, 840, DIG. 1, 714

[56] References Cited

U.S. PATENT DOCUMENTS

| | | | |
|---|---|---|---|
| 4,712,807 | 12/1987 | Kurosawa | 364/424.05 X |
| 4,765,648 | 8/1988 | Mander et al. | 280/714 X |
| 4,872,701 | 10/1989 | Akatsu et al. | 280/707 X |
| 4,903,983 | 2/1990 | Fukushima et al. | 364/424.05 X |
| 4,905,152 | 2/1990 | Kawabata | 364/424.05 |
| 4,934,731 | 6/1990 | Hiwatashi et al. | 280/707 X |
| 4,937,748 | 6/1990 | Yonekawa et al. | 364/424.05 |
| 4,939,655 | 7/1990 | Majeed et al. | 364/424.05 |

FOREIGN PATENT DOCUMENTS 61-268508 11/1986 Japan .................................. 280/707
62-139709 6/1987 Japan .

Primary Examiner—Parshotam S. Lall
Assistant Examiner—E. J. Pipala
Attorney, Agent, or Firm—Beveridge, DeGrandi & Weilacher

[57] ABSTRACT

In a system for controlling active suspensions of a motor vehicle, having fluid suspensions for the respective wheels, a longitudinal acceleration sensor, control valves for the respective suspensions, and a controller for adjusting the control valves to charge and discharge a fluid into and out of the fluid suspensions so as to control the vehicle attitude, a hysteresis circuit is provided to receive a longitudinal acceleration signal from the acceleration sensor, for hysteresis processing of the signal, whereby microvibration components included in the acceleration signal is removed. The width of hysteresis is increased as the vehicle speed increases because the amplitude of microvibration becomes larger as the vehicle speed increases. For more stable vehicle attitude control, a dead-zone circuit is provided to cut fluctuations of the hysteresis-processed signal within a specific width in the vicinity of zero.

20 Claims, 5 Drawing Sheets

SYSTEM FOR CONTROLLING ACTIVE SUSPENSIONS OF A VEHICLE

BACKGROUND OF THE INVENTION

The present invention relates to a system for controlling active suspensions of vehicles.

Active suspension systems of various forms have been developed and publicly disclosed as in Japanese Pat. Appln. Laid-Open Publn. No. 62-139709. A typical example of a known active suspension system comprises the following essential components. Individual suspensions are provided for each wheel for supporting the vehicle by fluid pressure. Charge and discharge of the fluid into and out of each suspension is controlled independently by the operation of a respective control valve. The operation of each control valve is controlled by opening and closing control signals generated by a controller which, responsive to information such as vertical acceleration of the vehicle mass above suspension units and extension and contraction displacement strokes of the suspensions, calculates command quantity of charge or discharge of fluid for each suspension unit. Thus the charge and discharge of the fluid into and out of each suspension is controlled.

Applicant has previously developed an active suspension system of the following description and has filed a U.S. patent application therefor (U.S. application Ser. No. 410,834). In the active suspension system as described above, sensors are used to detect accelerations in the longitudinal and lateral directions of the vehicle. The above described controller preestimates variations of the vehicle attitude (pitching and rolling) accompanying acceleration, deceleration or turning of the vehicle in response to the information from the sensors. Then, the controller computes command quantity of the charge and discharge of the fluid for maintaining the vehicle attitude in a desirable state, thus generating and transmitting signals for opening and closing the control valves.

When a vehicle is traveling on an even road surface, the higher the vehicle speed is, the larger is the longitudinal acceleration component due to vibrational motions of the vehicle.

In an active suspension system having a controller for controlling the vehicle attitude on the basis of detected value of the vehicle longitudinal acceleration (hereinafter referred to simply as longitudinal G) as described above, the longitudinal acceleration component arising from the vibrational motions of the vehicle is added as microvibration, i.e., noise, to the detection signal of the longitudinal acceleration sensor for detecting the longitudinal G. For this reason, if the vehicle attitude is controlled on the basis of the resulting detection signal, unnecessary control is performed so that not only does waste of energy occur, but there arises a possibility of instability of the vehicle attitude.

In order to eliminate the noise of the detection signal, the use of a low pass filter may be one solution. However, when a low-pass filter is used, the rise of the signal of the longitudinal G sensor is delayed at sudden braking. Consequently it becomes impossible to achieve the original object of controlling the vehicle attitude precisely and positively without delay.

SUMMARY OF THE INVENTION

It is an object of the present invention to overcome the above described problems encountered hereinbefore and to provide a system for controlling active suspensions of a vehicle in which the vehicle attitude is controlled precisely and positively without delay.

According to the present invention, there is provided a system for controlling active suspensions of a vehicle having fluid suspensions provided for respective wheels, means for charging and discharging a fluid into and out of the respective fluid suspensions to extend and contract the suspensions independently, a vehicle speed sensor for sensing the vehicle speed, a G sensor provided in the vehicle for detecting acceleration of the vehicle, and a controller responsive to an acceleration signal from the G-sensor for adjusting said means for charging and discharging the fluid so as to control the vehicle attitude, said system comprising: hysteresis means for hysteresis-processing the acceleration signal in accordance with a hysteresis width; and means responsive to the vehicle speed for increasing the hysteresis width for the acceleration signal as the vehicle speed increases.

According to the present invention, microvibration (noise) component of the detection signal of the G-sensor is effectively eliminated, and thus superfluous control energy waste is reduced. Furthermore, the set width of a dead-zone circuit for cutting the signal within the set width in the vicinity of zero of the signal after hysteresis processing may be made large when the vehicle speed becomes high. By this measure, further stabilization of the vehicle attitude is attained during steady-state driving at substantially constant speed.

Preferred embodiments of the present invention will become understood from the following detailed description referring to the accompanying drawings.

DESCRIPTION OF THE PREFERRED EMBODIMENT

Figure 1:
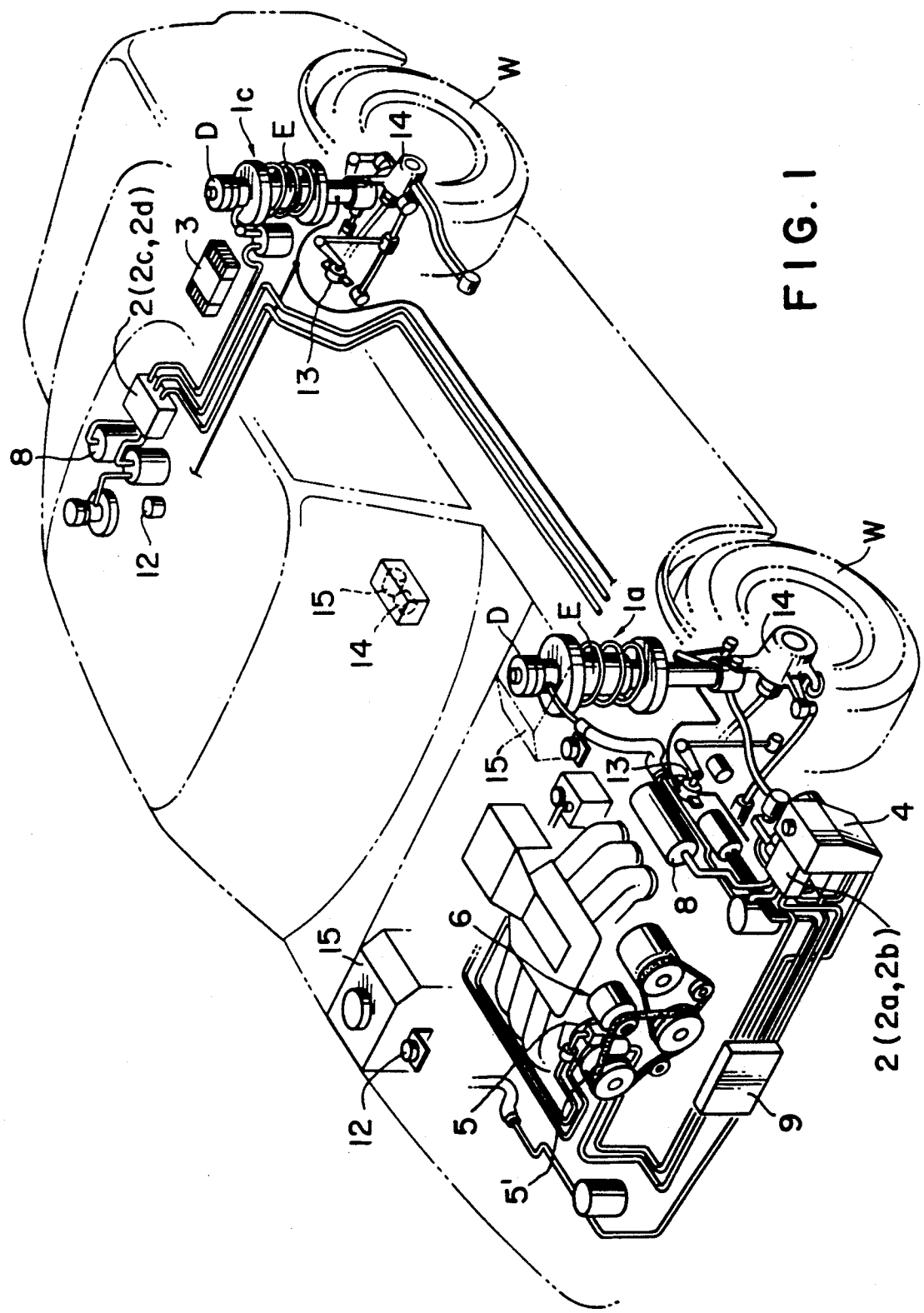
FIG. 1 is a schematic perspective view of a motor vehicle showing a layout of a control system according to the present invention.
Figure 2:
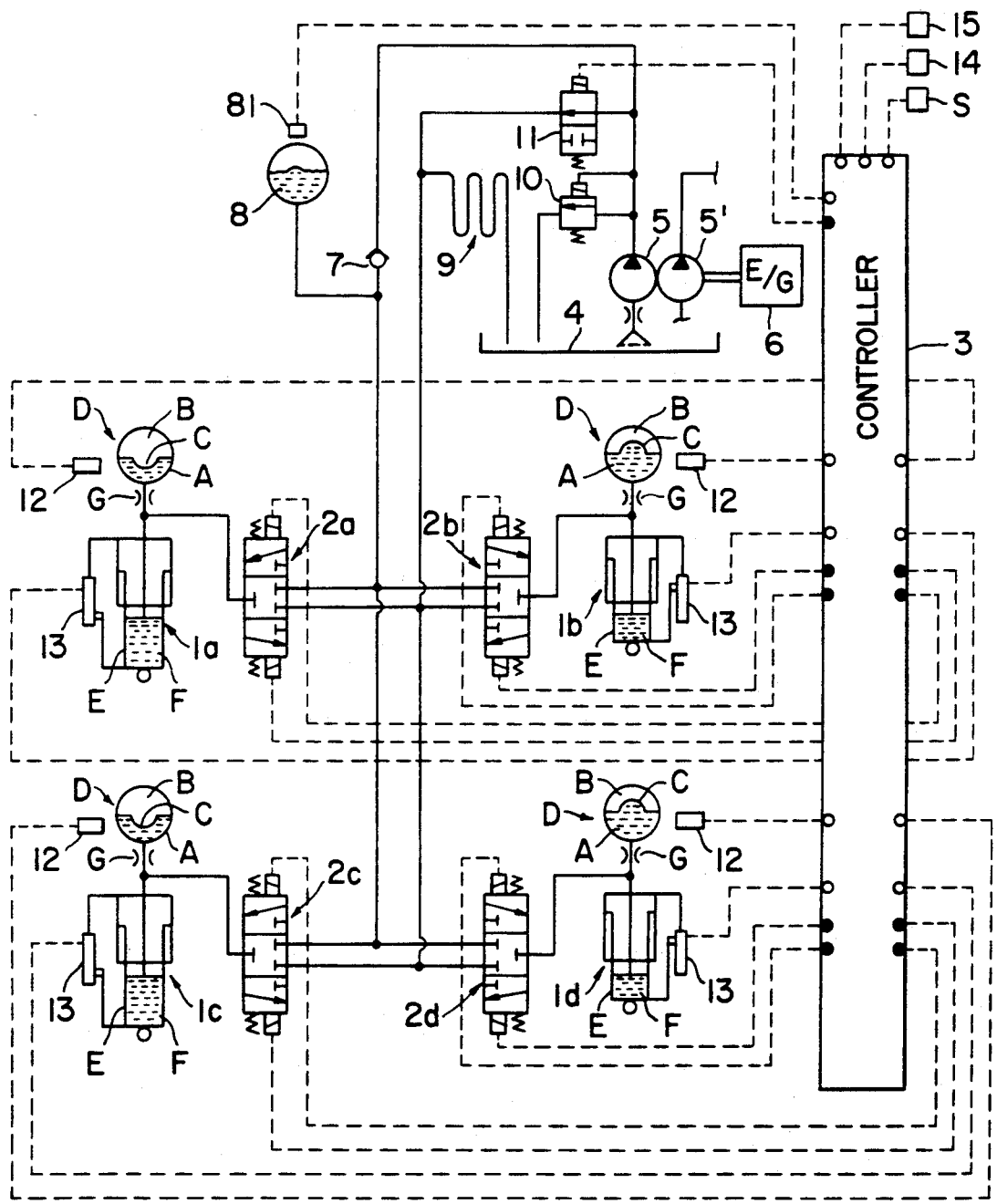
FIG. 2 is a diagram showing a hydraulic system for suspension units according to the present invention.

FIGS. 1 and 2 show an active suspension system to which the present invention may be applied. In FIG. 2, reference characters 1a and 1b indicate suspensions of left and right front wheels of a motor vehicle, and 1c and 1d indicate suspensions of left and right rear wheels Each of the suspensions 1a, 1b, 1c and 1d is provided with a pneumatic spring portion D and a hydraulic cylinder E. The spring portion D has an oil chamber A and an air chamber B which are divided by a diaphragm C. The oil chamber A of the spring portion D and an oil chamber F of the hydraulic cylinder E are communicated through an orifice G. As shown in FIG. 1, one end of the hydraulic cylinder E (such as a bottom portion of the cylinder) is connected to a suspension arm member 14 on the vehicle wheel W, and the other end (a piston rod) of the hydraulic cylinder E is connected to a member 15 of a vehicle chassis. In accordance with the load on the cylinder E, hydraulic oil in the oil chamber F flows into and out of the oil chamber A through the orifice G so as to generate an appropriate damping force and at the same time to produce a spring action by the volumetric elasticity of the air sealed in the air chamber B. The system described above is a known hydropneumatic suspension system.

There are provided control valves 2a, 2b, 2c and 2d that supply and discharge oil to and from the oil chamber F of the hydraulic cylinders E. These control valves 2a, 2b, 2c and 2d are operated independently by a valve drive signal from a controller 3 to be described later. In FIG. 1, the control valves 2a, 2b, 2c and 2d are installed separately in two groups for the front and rear suspensions.

An oil pump 5 is driven by an engine 6 to pump up oil from an oil reservoir 4 to the system. In the system shown, an oil pump 5' for power steering and the oil pump 5 described above are driven in tandem by the engine 6.

The oil discharged from the oil pump 5 passes through a check valve 7 and is stored in a high-pressure accumulator 8. In FIG. 1, the accumulator 8 is shown to be divided into two sections for the front and rear suspensions. When, some of the control valves 2a, 2b, 2c and 2d are switched to the intake side, high-pressure oil is supplied through the control valves that have been switched to the intake side, to the oil chamber F of the suspensions 1a, 1b, 1c and 1d. When some of the control valves 2a, 2b, 2c and 2d are switched to the discharge side, oil is discharged from the oil chambers F of the suspensions 1a, 1b, 1c and 1d and the oil passes through an oil cooler 9 to flow into the oil reservoir 4.

FIG. 2 shows a relief valve 10 and a valve 11 which is switched to the unload state indicated in the figure, when signals, generated by the controller 3 responsive to signals from a pressure sensor 81, indicate that the high-pressure accumulator 8 has attained a predetermined pressure. When the valve 11 is switched to the unload side, the oil discharged from the oil pump 5 flows to the oil cooler 9 and then into the oil reservoir 4.

The suspensions 1a, 1b, 1c and 1d are provided with suspension stroke sensors 13 as shown in FIGS. 1 and 2. The sensor 13 detects vertical relative displacement for each suspension between the wheel and the vehicle body and input the information of the relative displacement for each of the suspensions 1a, 1b, 1c and 1d to the controller 3.

In order to detect behaviors of the vehicle, there are provided a vertical G-sensor 12 to detect vehicle vertical acceleration (vertical G), a lateral G-sensor 15 to detect vehicle lateral acceleration (lateral G) and a longitudinal G-sensor 14 to detect vehicle longitudinal acceleration (longitudinal G). The positions where the G-sensors 12, 14 and 15 are installed are as indicated in FIG. 1. There is further provided a vehicle speed sensor S to detect the speed of the vehicle. Signals of the sensors 12, 13, 14, 15 and S are inputted to the controller 3. Responsive to the input, the controller 3 determines control quantity of charge and discharge of oil for each suspension to send valve drive signals to the respective control valves 2a, 2b, 2c and 2d, as will be described below with reference to FIGS. 3 through 6.

Figure 3:
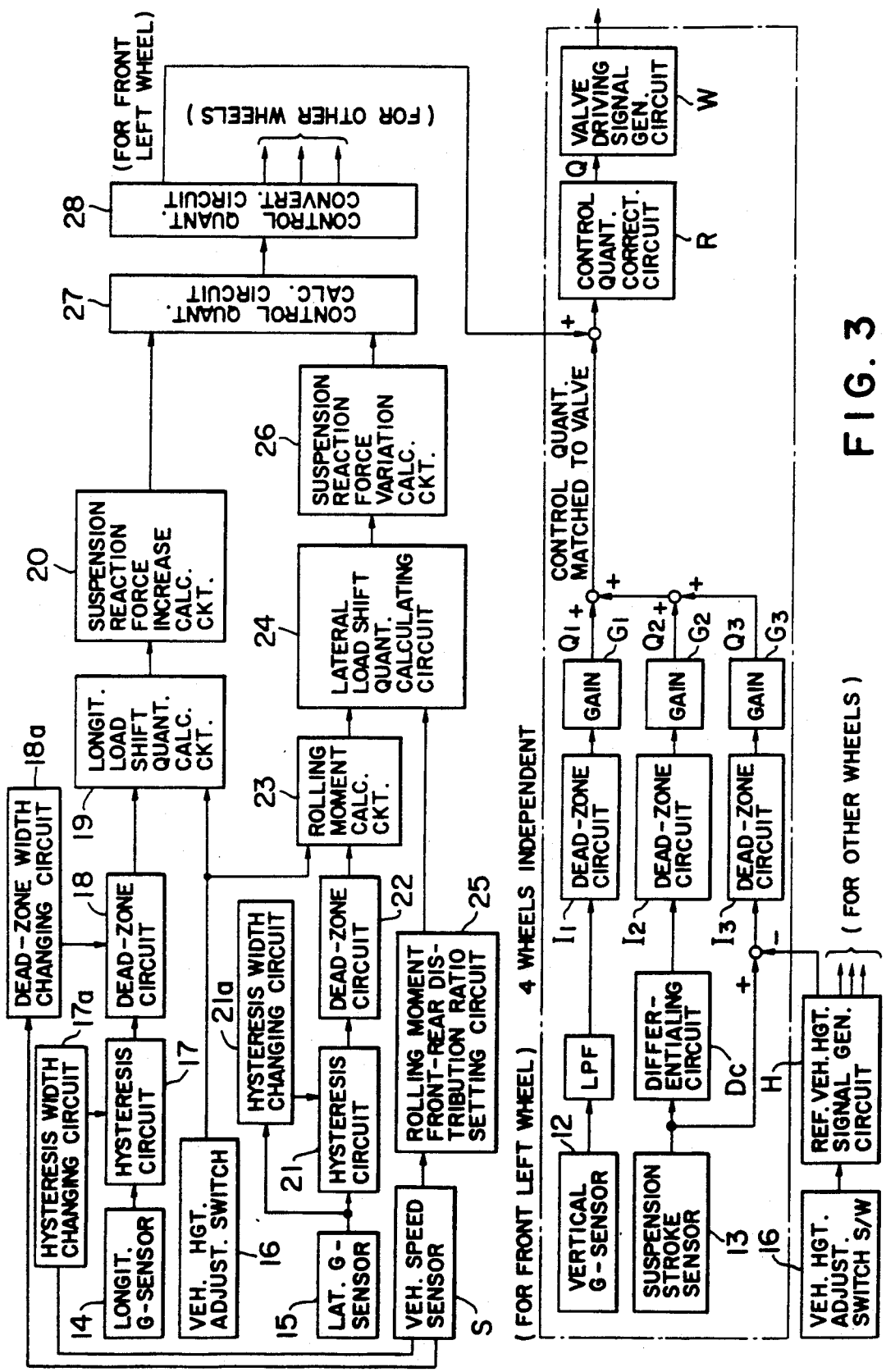
FIG. 3 is a block diagram of the control system according to the present invention.

In FIG. 3, the portion enclosed by a chain line is a control block diagram for one of four suspensions 1a, 1b, 1c and 1d, for example, the suspension 1a of the left front wheel. While not shown in FIG. 3, a total of four sets of the same control logic are provided for carrying out independent control of the respective suspensions 1a, 1b, 1c and 1d.

In each suspension unit, the vertical acceleration and the vertical relative displacement (stroke) are respectively detected by the sensors 12 and 13. The vertical acceleration signal from the vertical G-sensor 12 is passed through a low-pass filter LPF to reduce its high-frequency component. The signal is then passed through a dead-zone circuit $I_1$ to remove a signal of a set range in the neighborhood of zero. The resulting signal is subjected to multiplication by a gain circuit $G_1$. Thus a control command quantity $Q_1$ matched to the characteristics of the corresponding control valve 2a, 2b, 2c or 2d is obtained.

The vertical relative displacement or the stroke signal from the stroke sensor 13 is inputted to a differentiating circuit Dc and a dead-zone circuit $I_3$. The signal passing through the differentiating circuit Dc is converted into a vertical relative displacement or a stroke speed signal. The speed signal passes through a dead-zone circuit $I_2$, which removes therefrom a signal fraction within a set zone in the vicinity of zero. The resulting signal is passed through a gain circuit $G_2$ to become a control command quantity $Q_2$ matched to the corresponding control valve characteristics.

By setting a vehicle height adjusting switch 16, a reference vehicle height signal is generated from a reference vehicle height generating circuit H. The reference vehicle height signal is subtracted from the vertical relative displacement signal to be inputted to the dead-zone circuit $I_3$, and an actual relative displacement signal is obtained. The actual relative displacement signal is passed through the dead-zone circuit $I_3$, where a signal fraction within a set zone in the vicinity of zero is removed therefrom. The resulting signal is passed through a gain circuit $G_3$ to become a control command quantity $Q_3$ matched to the corresponding control valve characteristic.

The control command quantity ($Q_1$, $Q_2$, and $Q_3$) matched to the characteristics of the corresponding control valve is as follows. In the case where the control valve is, for example, a flow rate control valve, the control command quantity is the length of opening time of the valve, necessary to obtain a required quantity of hydraulic oil to be charged or discharged. The length of the valve opening time is determined with consideration of the valve opening-closing characteristics.

The three control command quantities $Q_1$, $Q_2$, and $Q_3$ are added as shown. The resulting sum of the quantities is passed through a control quantity correction circuit R to be converted into a corrected command quantity Q corrected with consideration of environmental conditions such as temperature and pressure loss due to length of piping. The corrected quantity Q is passed through a valve driving signal generating circuit W, which thereupon generates a control valve opening/closing signal. Thus, the control valve 2a is switched to the oil charging side or the discharge side. As a result, charging or discharging of oil of the command quantity into or out of the suspension 1a is accomplished.

In the control operation described above, when vertical acceleration is detected, oil within the suspension 1a, for example, is discharged responsive to upward acceleration. For downward acceleration, oil is introduced into the suspension 1a. By such control operation, with respect to forces from below such as a bump or thrust from the road surface, soft and high-attenuation suspension characteristics are created. With respect to forces from above (i.e., from the vehicle body), apparently hard suspension characteristics are created so as to maintain the vehicle height at the reference vehicle height due to the control responsive to the vertical stroke speed and the vertical stroke, by controlling the charge and discharge of the oil.

Furthermore, by passing the vertical acceleration signal through the low-pass filter LPF, the control system does not react to vibrations in the high frequency region as in resonance of the mass below the suspensions, but responds to vibrations of low-frequency region as in resonance of the mass above the suspensions. Accordingly, the control system can avoid bouncing so as to improve the driveability, thus preventing waste of energy for the control.

The vehicle height adjusting switch 16 is a change-over switch for changing over, for example, from normal vehicle height to high vehicle height. When normal vehicle height is selected, the reference vehicle height signal generating circuit H generates a low reference vehicle height signal. When the vehicle height adjusting switch 16 is changed over to the side of the high vehicle height, the reference vehicle height signal generating circuit H generates a high reference vehicle height signal.

The control responsive to the vertical stroke signal from the sensor 13 functions to maintain the vehicle height at the reference vehicle height. Therefore, when the reference vehicle height is switched from the normal reference vehicle height to the high reference vehicle height, the control command quantity $Q_3$ is generated for charging the oil. Thus oil is charged into the suspension 1a, for example, thereby to raise the vehicle height to a height equal to the high reference vehicle height. When the vehicle height adjusting switch 16 is returned to the side of the normal vehicle height, the control command quantity $Q_3$ is generated for oil discharge. Thus, the oil within the suspension 1a is discharged. As a consequence, the vehicle height is lowered to the normal reference vehicle height. The discharging and charging of oil are simultaneously carried out for all the suspensions by the switching operation of the wheel height adjusting switch 16.

In addition to the control in the state of normal driving state, control is necessary also when a large acceleration is suddenly applied in the longitudinal direction or the lateral direction of the vehicle at the time of sudden braking, abrupt acceleration, or sudden turning. In such a case, prompt and positive control of the vehicle attitude without delay is required. For this purpose, there is provided a control logic based on the detection signals of the longitudinal G-sensor 14 and the lateral G-sensor $G_2$.

More specifically, as shown in FIG. 3, the longitudinal acceleration signal detected by the longitudinal G-sensor 14 is passed through, and converted by a hysteresis circuit 17 and a dead-zone circuit 18. By the hysteresis and dead-zone circuits 17 and 18, the longitudinal acceleration signal is converted to attain a control which does not respond to longitudinal G fluctuations of an ordinary order during normal driving but responds to large pitching of the vehicle body at the time of full acceleration or of braking with greater degree than medium. The signal thus converted is then introduced into a circuit 19 for calculating longitudinal load shift quantity.

The calculating circuit 19 operates to calculate the load shift quantity in the longitudinal direction, responsive to the input signal fed thereinto, previously stored vehicle specification, and information on the present height of the vehicle center of gravity above the ground determined from the vehicle height adjusting switch 16.

The calculation result is transmitted to a circuit 20 for calculating variation of suspension reaction force. The calculating circuit 20 operates to calculate the variation of the suspension reaction force, which may arise from the load shift quantity at each position of the suspension, with consideration of driving force and braking force acting on the tires, responsive to the information thus fed thereinto and other information such as the type of the suspensions and the driving type (front wheel drive, rear wheel drive, four-wheel drive, etc.).

Consideration of the driving force and the braking force acting on the tires depending upon the type of the suspensions and the driving type, has the following significance. In the case of a suspension of the trailing-arm type, for example, when a braking force acts on the wheel, the reaction force is received and held by a bearing of the trailing arm. For this reason, in general, a moment in the direction for compressing the suspension is applied to the trailing arm (antilift geometric characteristic at the time of braking). Accordingly, the reaction force to the front wheel increases and the reaction force to the rear wheel decreases with respect to longitudinal load shifting quantity which arises due to inertial force. As a suspension reaction force at the time of acceleration, a moment is applied in the direction for stretching the suspension spring due to the driving reaction force in the case of a driving wheel. In the case of a driven wheel, there is no such moment.

As described above, the variation of the suspension reaction force differs depending upon factors such as the position of the trailing arm and the position of the rocking or pivoting axis thereof. In the case of a suspension of the wishbone type, the variation of the suspension reaction force differs depending upon the inclinations of the rocking axes of upper and lower control arms. In the case of a suspension of the MacPherson type, the variation differs depending upon factors such as the inclination of the suspension strut and the position of the rotational axis of the lower arm.

Therefore, the variation of the reaction force is calculated accurately on the basis of the type of suspension and the type of driving.

Similarly, as in the case of the longitudinal G-sensor 14, the lateral acceleration detected by the lateral G-sensor 15 is also passed through a hysteresis circuit 21 and a dead-zone circuit 22. Thus, the control avoids response to minute lateral G-fluctuations occurring during normal driving. In this manner, only a signal above a predetermined value is inputted to a circuit 23 for calculating the rolling moment. From the input signal, the calculating circuit 23 calculates the rolling moment, on the basis of the vehicle specification previously stored and information on the height of the vehicle body center of gravity determined by the vehicle height adjusting switch 16. The calculation result is transmitted to a circuit 24 for calculating a lateral load shift quantity.

Separately, a vehicle speed signal generated by a vehicle speed sensor S is transmitted to a circuit 25 for setting rolling moment front-rear distribution ratio. From the vehicle speed information thus received, the circuit 25 determines the rolling moment front rear distribution ratio, on the basis of a characteristic of a previously set vehicle speed—rolling moment front-rear distribution ratio. The determined rolling moment front-rear distribution ratio is transmitted to the calculating circuit 24.

The calculating circuit 24 operates to distribute the generated rolling moment inputted from the rolling moment calculating circuit 23 to the front and rear wheels and calculates the lateral shift load quantity between the left and right of the front and rear wheels, on the basis of the rolling moment front rear distribution ratio determined by the distribution ratio setting circuit 25.

The resulting output of the calculating circuit 24 is fed to a circuit 26 for calculating the variation of the suspension reaction force. In the calculating circuit 26, the total lateral force acting on the wheels corresponding to the generated lateral G is distributed to the front and rear wheels based on the yaw moment equilibrium equation with the position of the vehicle center of gravity and the distance between the front and rear axles. Then, with consideration of the lateral load shift quantity between the front and rear wheels calculated by the calculating circuit 24, the lateral forces on the front and rear wheels, the vehicle height, and the type of the suspensions, the variation of the suspension reaction force is calculated separately for each of the front and rear suspensions.

The variation of the suspension reaction forces calculated by the calculating circuits 20 and 26 are added in a circuit 27 for calculating control quantity. The total variation of the suspension reaction force is determined for each suspension. Furthermore, the control quantity of charge and discharge of the oil matches the total variation of the suspension reaction force for maintaining the internal pressure of each suspension. The resulting control quantity is converted into a control command quantity matching the valve specification or characteristic in a circuit 28 for converting control quantity. The converted control command quantity is added to the control command quantities $Q_1$, $Q_2$, and $Q_3$. The resulting quantity is fed into a circuit R for correcting the control quantity.

As described above, there is provided a control system for controlling the charge and discharge of oil for each suspension independently in response to vertical acceleration of the mass above the suspension and the vertical relative displacement between the masses above and below the suspensions, with the aim of improving the driveability. Moreover, the above control system controls vehicle attitude responsive to the longitudinal G and the lateral G of the vehicle. By the arrangement described above, under driving conditions such as the acceleration and the turning, vehicle body attitude is controlled without responsive delay by the control logic based on the longitudinal G and the lateral G, with respect to, transitionally, the pitching and rolling of the vehicle body.

At the same time, an advantage described below is afforded since the control system controls the vehicle body rolling on the basis of the front-rear distribution ratio of the rolling moment according to the vehicle speed. That is, at high vehicle speed, steering characteristic is maintained in ordinary under-steering to keep the stability of the vehicle (in general, set at weak under steering which is not relatively strong). At low vehicle speed, the under-steering tendency is weakened further relative to the under-steering at high vehicle speed, or alternatively, the steering characteristic is changed to the over-steering thereby to increase the turning characteristic of the vehicle. By such measures, it becomes possible to vary the steering characteristic in accordance with the vehicle speed.

When the vehicle is being driven, there are small surface unevennesses or irregularities even on a good road. Every time the wheels over-ride the irregularities, vibrational forces are generated in the front-rear direction. The vibrational forces appear as a microvibration or noise in the detection signal of the longitudinal G-sensor 14.

Such a noise is eliminated by using a low-pass filter. However, under conditions such as sudden braking, the use of a low-pass filter causes a delay in the rise of the signal of the longitudinal sensor 14, and the response of the vehicle attitude control becomes poor.

Accordingly, the present invention provides a hysteresis circuit 17 (and 21) as described above in the detection signal circuit of the longitudinal G-sensor 14 (and of the lateral G-sensor 15). By this provision, only the noise is eliminated, and the countermeasure at the time of a sudden and large variation of the longitudinal G, such as the countermeasure at the time of sudden braking, is carried out precisely without delay. It was noted that, the higher the vehicle speed, the larger is the microvibration (noise). On the basis of such relationship, a logic is provided for variably controlling the hysteresis width of the hysteresis circuit 17 so that the hysteresis width will increase with increasing vehicle speed as indicated in FIGS. 4A through 4C.

Figure 4A:
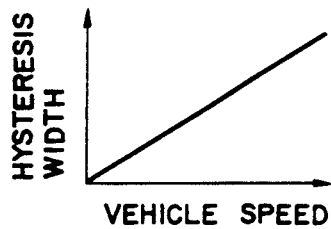
FIGS. 4A, 4B, and 4C are graphs respectively indicating examples of hysteresis width of a hysteresis circuit in the control system shown in FIG. 4.
Figure 4B:
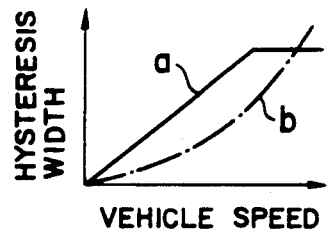
Figure 4C:
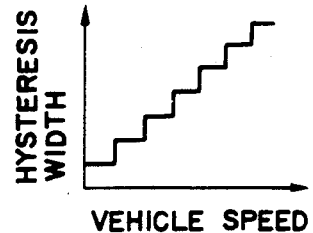

In the variable control of the hysteresis width, the characteristic thereof may be as indicated in FIG. 4A, wherein the hysteresis width varies linearly with the vehicle speed. The slope of the linear curve is determined by factors such as the consumption flow rate of the suspension fluid and a drive feeling evaluation. The relationship may also be nonlinear as indicated by curves a and b in FIG. 4B. In the case where a digital controller is used, a discontinuous relationship may also be used as indicated in FIG. 4C.

For the controller 3, a digital controller can be used. One example of processing the detection signal of the longitudinal G-sensor 14 will now be described with reference to FIG. 5.

Figure 5:
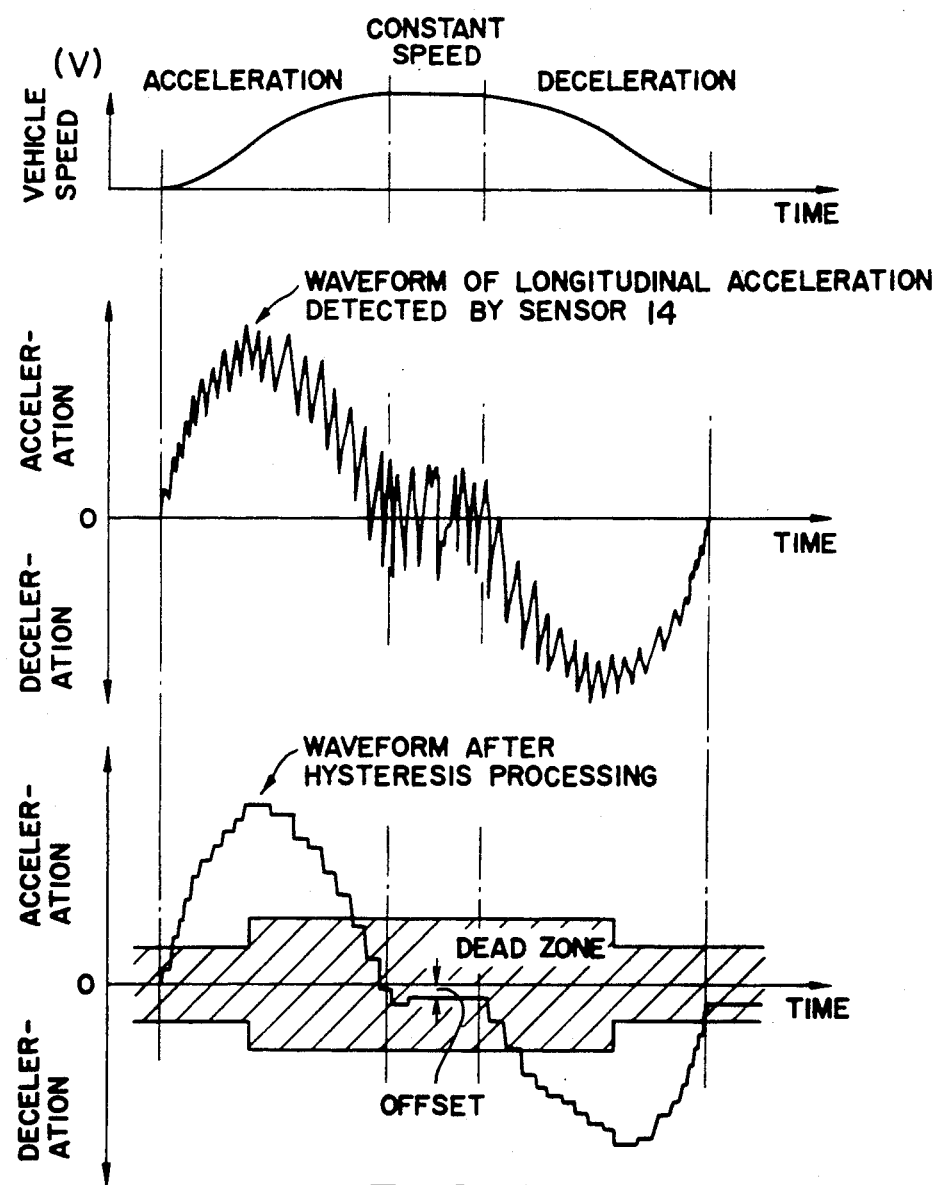
FIG. 5 is a time chart indicating the relationship between signal waveforms of the detection signal of the longitudinal G-sensor and of a signal after the detection signal has been hysteresis-processed and the vehicle speed.

FIG. 5 is a graphical representation of variations with time of detection signals of the longitudinal G-sensor 14, which occur as the vehicle is started, accelerated, driven at a constant speed, decelerated and stopped as indicated by the upper graph. The middle graph indicates the waveform of the detection signal generated by the longitudinal G-sensor 14. The waveform of the detection signals after hysteresis processing is indicated in the lower graph. As is apparent from the graphs of FIG. 5, as the vehicle speed increases, the hysteresis width is increased. For this purpose, the output signal of the vehicle speed sensor S is supplied to the hysteresis circuit 17 as indicated in FIG. 3. A circuit 17a functions to change the hysteresis width responsive to the vehicle speed signal from the sensor S. As the vehicle speed increase, the amplitude of microvibration becomes large. It will be understood that the increase of the hysteresis width with increase of the vehicle speed serves to cover the increased amplitude of microvibration. Thus, the component of the microvibration (noise) of the detection signal of the longitudinal G-sensor 14 is completely eliminated by the hysteresis processing even at high vehicle speed. As a result, control energy waste arising from unnecessary control is suppressed.

As indicated by the example of a waveform after hysteresis processing in FIG. 5, when hysteresis processing is carried out, at zero longitudinal G (during driving at a constant vehicle speed), the value after hysteresis processing is slightly offset from zero. However, the dead-zone circuit 18 (FIG. 3) eliminates the offset. The circuit 18 operates to cut fluctuations within a specific width in the vicinity of zero. By this provision, the offset of the value of the longitudinal acceleration becomes negligible.

In this connection, it is desirable that the dead-zone width of the dead-zone circuit 18 be so variably controlled as to become large as the vehicle speed increases. For this purpose, the output signal of the vehicle speed sensor S is supplied to a circuit 18a (FIG. 3) for changing the dead-zone width of the circuit 18. By such control, stabilization of the vehicle attitude during steady-state high-speed driving is further improved.

Figure 6:
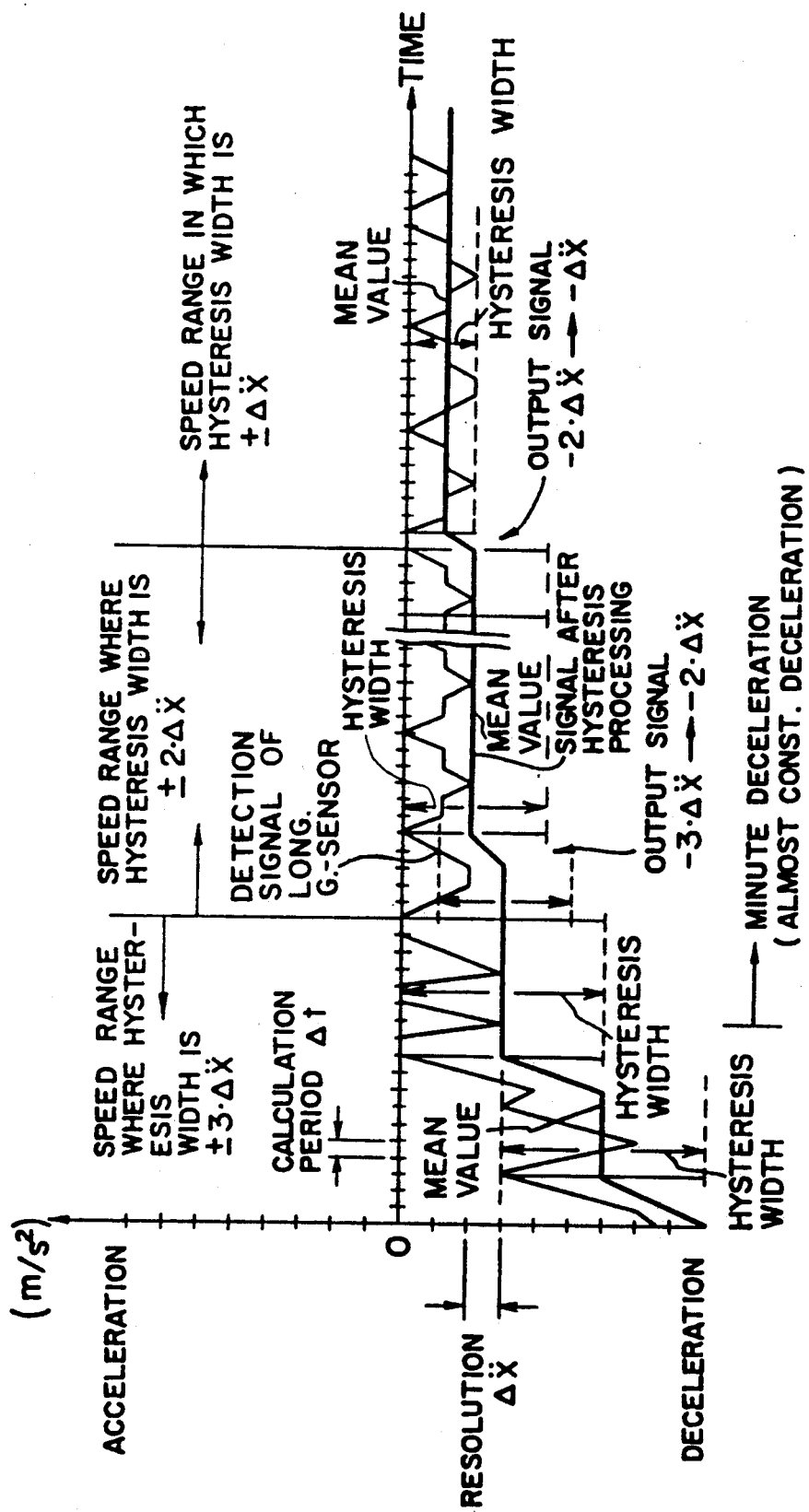
FIG. 6 is a time chart indicating one example of the relationship between a detection signal of the longitudinal G sensor and a signal waveform after that detection signal has been hysteresis processed during minute deceleration of the vehicle.

The desirability of variable control of the dead-zone width will now be explained with reference to FIG. 6. FIG. 6 relates to a case where the vehicle speed is lowered slightly without an occurrence of deceleration in a steady driving state of the vehicle. FIG. 6 indicates the waveform (shown by thin line) of the detection signal of the longitudinal G-sensor 14. The figure also indicates the waveform (shown by thick line) after hysteresis processing.

As indicated in the figure, each time the vehicle speed reaches threshold speeds at which the hysteresis width is changed, the output signal after hysteresis processing varies from $-3\Delta$ to $-2\Delta$ and then to $-\Delta$. The stepwise variation above occurs because the signal is being digital processed. A real variation after removal of the microvibration (noise) component is smoother.

In this case, the control system must be prevented from reacting to the signal variation occurring after the hysteresis width has changed. For this purpose, it is necessary to provide a dead zone and to set the width of the dead zone at a value larger than the width of the hysteresis.

The control system must also be prevented from reacting to microvibration (noise) in the longitudinal direction during constant-speed driving. For this purpose, it is necessary to make the dead-zone width larger than the width of the hysteresis. Moreover, the hysteresis width must be made larger than the width the microvibration (noise) in the longitudinal direction. As mentioned above, the amplitude of the microvibration increases with increase in the vehicle speed. In correspondence with this, the hysteresis width is controlled to become large as the vehicle speed increases, for example, as indicated in FIGS. 4A, 4B and 4C. For this reason, the dead-zone width is also increased when the vehicle speed becomes high as indicated in FIG. 5 thereby to accomplish variable control. By this provision, further stabilization of the vehicle during steady-state driving can be attained.

The system also has a circuit 21a for changing the hysteresis width of the circuit 21a in response to the lateral G detected by the lateral G-sensor 15. The hysteresis width for the detection signal of the lateral G-sensor 15 increases with increase of the lateral G, so as to accurately cut the microvibration of the detection signal.

It is to be noted that the present invention is not limited to the embodiments thereof illustrated in FIGS. 2 and 3 but is applicable to any active suspension system of the following description for a vehicle. Such an active suspension system has suspensions supporting the vehicle body by fluid pressure. Means are provided for detecting at least variations in the extension-contraction strokes of the suspensions. The active suspension system also carries out charge and discharge of the fluid into and out of each suspensions independently so as to maintain the vehicle attitude in normal state in accordance with the variations in the extension-contraction strokes of the suspensions. The system further has a longitudinal G-sensor for detecting the longitudinal G of the vehicle. From the detection signal of the longitudinal G-sensor, variation of pitching of the vehicle is estimated. The charge and discharge of the fluid is controlled so as to maintain the vehicle attitude in normal state.

By the practice of the present invention as described above, the vehicle attitude is controlled with high precision and good response against pitching of the vehicle at the time of abrupt acceleration and deceleration. At the same time, the microvibration (noise) component carried by the detection signal of the longitudinal G sensor is positively removed. In this manner, waste of control energy due to superfluous control is reduced, and stabilization of the vehicle attitude is achieved. Thus, the present invention has a high degree of utility.

While the presently preferred embodiments of the present invention have been shown and described, it is to be understood that the disclosure is for the purpose of illustration and that various changes and modifications may be made without departing from the scope of the invention as set forth in the appended claims.

What is claimed is:

1. A system for controlling an active suspension of a vehicle, having fluid suspensions provided for respective wheels and valve means for charging and discharging the fluid into and out of the respective fluid suspensions to extend and contract the suspensions independently, comprising:

vehicle speed sensing means for sensing vehicle speed and for generating a vehicle speed signal indicative of the vehicle speed;

acceleration sensing means for detecting acceleration of the vehicle and for generating an acceleration signal indicative of the acceleration;

hysteresis means for smoothing said acceleration signal by processing said acceleration signal with a predetermined hysteresis width;

hysteresis width changing means responsive to said vehicle speed signal for changing said predetermined hysteresis width based on the magnitude of said vehicle speed, said predetermined hysteresis width being set wider as said vehicle speed becomes larger; and controlling means responsive to an acceleration signal processed by said hysteresis means for controlling said valve means to adjust an amount of the fluid to be charged and discharged in said suspensions so as to control the vehicle attitude.

2. The system according to claim 1, wherein said hysteresis width changing means is adapted to vary said hysteresis width linearly with said vehicle speed.

3. The system according to claim 1, wherein said hysteresis width changing means is adapted to vary said hysteresis width gradually with said vehicle speed.

4. The system according to claim 1, wherein said hysteresis width changing means is adapted to vary said hysteresis width stepwise with said vehicle speed.

5. The system according to claim 1, wherein said acceleration sensing means is a longitudinal G-sensor for detecting longitudinal acceleration of the vehicle.

6. The system according to claim 5, further comprising:
dead zone means for cutting the fluctuations of said acceleration signal processed by said hysteresis means within a predetermined dead zone width in the vicinity of zero.

7. The system according to claim 6, further comprising:
dead zone width changing means responsive to said vehicle speed signal for changing said predetermined dead zone width based on the magnitude of said vehicle speed, said predetermined dead zone being set wider as said vehicle speed becomes larger.

8. The system according to claim 7, wherein said dead zone width changing means is adapted to set said predetermined dead zone width wider than said predetermined hysteresis width.

9. The system according to claim 7, further comprising:
producing means for producing a desired vehicle height signal;
longitudinal load shaft quantity calculating means responsive to output signal from said dead zone means and said vehicle height signal for calculating a longitudinal load shift quantity;
suspension reaction force variation calculating means responsive to output signal from said longitudinal load shift quantity calculating means for calculating a variation in the reaction force of each of said suspensions; and
control quantity calculating means responsive to output signal from said suspension reaction force variation calculating means for calculating a control quantity to adjust said valve means.

10. The system according to claim 9, further comprising:
a lateral G-sensor provided on the vehicle for detecting lateral acceleration of the vehicle and for generating a lateral acceleration signal indicative thereof;
second hysteresis means for smoothing said lateral acceleration signal by hysteresis-processing thereof;
second dead zone means for cutting the fluctuations of output signal from said second hysteresis means in the vicinity of zero;
rolling moment calculating means responsive to said vehicle height signal and output signal from said second dead zone means for calculating a rolling moment;
rolling moment distribution ratio setting means responsive to said vehicle speed signal for setting a front-read rolling moment distribution ratio;
lateral load shift quantity calculating means responsive to output signals from said rolling moment calculating means and said rolling moment distribution ratio calculating means, for calculating a lateral load shift quantity and for generating a lateral load shift quantity signal indicative thereof; and
second suspension reaction force variation calculating means responsive to output signal from said lateral load shift quantity calculating means, for calculating a variation in the reaction force of each suspension, whereby said control quantity calculating means is responsive to output signal from said second suspension reaction force variation calculating means for calculating said control quantity.

11. The system according to claim 10, further comprising:
second hysteresis width changing means for changing a second predetermined hysteresis width applied to said lateral acceleration signal based on the magnitude of said lateral acceleration signal detected by said lateral acceleration sensor, said second predetermined hysteresis width being set wider as said lateral acceleration increases.

12. A system for controlling an active suspension of a vehicle, having fluid suspensions provided for respective wheels, valve means for charging and discharging the fluid into and out of the respective fluid suspensions to extend and contract the suspensions independently, comprising:
acceleration sensing means for detecting acceleration of the vehicle and for generating an acceleration signal indicative of the acceleration;
hysteresis means for smoothing said acceleration signal by processing said acceleration signal with a predetermined hysteresis width;
hysteresis width changing means responsive to said acceleration signal for changing said predetermined hysteresis width based on the magnitude of said acceleration, said predetermined hysteresis width being set wider as said acceleration is larger; and
controlling means responsive to an acceleration signal processed by said hysteresis means for controlling said valve means to adjust an amount of the fluid to be charged and discharged in said suspensions so as to control the vehicle attitude.

13. The system according to claim 12, wherein said acceleration sensing means is a lateral G-sensor for detecting lateral acceleration of the vehicle.

14. The system according to claim 13, further comprising:
dead zone means for cutting the fluctuations of said acceleration signal processed by said hysteresis means within a predetermined dead zone width in the vicinity of zero.

15. The system according to claim 14, further comprising:
producing means for producing a desired vehicle height signal;
vehicle speed sensing means for sensing vehicle speed and for producing a vehicle speed signal indicative of said vehicle speed;
rolling moment calculating means responsive to said vehicle height signal and output signal from said dead zone means for calculating a rolling moment;
rolling moment distribution ratio setting means responsive to said vehicle speed signal for setting a front-rear rolling moment distribution ratio;

lateral load shift quantity calculating means responsive to output signals from said rolling moment calculating means and said rolling moment distribution ratio calculating means, for calculating a lateral load shift quantity;

suspension reaction force variation calculating means responsive to output signal from said lateral load shift quantity calculating means, for calculating a variation in the reaction force of each suspension; and control quantity calculating means responsive to output signal from said suspension reaction force variation calculating means for calculating a control quantity to adjust said valve means.

16. The system according to claim 15, further comprising:

a longitudinal G-sensor provided on the vehicle for detecting longitudinal acceleration of the vehicle and for generating a longitudinal acceleration signal indicative thereof;

second hysteresis means for smoothing said longitudinal acceleration signal by hysteresis-processing said longitudinal acceleration signal;

second dead zone means for cutting the fluctuations of output signal from said second hysteresis means in the vicinity of zero;

longitudinal load shift quantity calculating means responsive to output signal from said dead zone means and said vehicle height signal for calculating a longitudinal load shift quantity;

suspension reaction force variation calculating means responsive to output signal from said longitudinal load shift quantity calculating means for calculating a variation in the reaction force of each of said suspensions, whereby said control quantity calculating means is responsive to output signal from said second suspension reaction force variation calculating means for calculating said control quantity.

17. The system according to claim 16, further comprising:

second hysteresis width changing means responsive to said vehicle speed signal for changing a second predetermined hysteresis width to be applied to said longitudinal acceleration signal based on the magnitude of said vehicle speed, said second predetermined hysteresis width being set wider as said vehicle speed is larger.

18. The system according to claim 17, further comprising:

dead zone width changing means responsive to said vehicle speed signal for changing a predetermined dead zone width to be applied to said output signal from said second hysteresis means based on the magnitude of said vehicle speed, said predetermined dead zone being set wider as said vehicle speed is larger.

19. The system according to claim 18, wherein said dead zone width changing means is applied to set said predetermined dead zone width wider than said second predetermined hysteresis width.

20. In a system for controlling an active suspension of a vehicle, having fluid suspensions provided for respective wheels, valve means for charging and discharging the fluid into and out of the respective fluid suspensions to extend and contract the suspensions independently, a vehicle speed sensor for sensing vehicle speed and for generating a vehicle speed signal indicative of the vehicle speed, a G-sensor for provided on the vehicle for detecting acceleration of the vehicle and for generating an acceleration signal indicative of the acceleration, hysteresis means for smoothing said acceleration signal by processing said acceleration signal with a predetermined hysteresis width, dead zone means for cutting the fluctuations of said acceleration signal within a predetermined dead zone width in the vicinity of zero, and controlling means responsive to said acceleration signal for controlling said valve means to adjust an amount of the fluid to be charged and discharged in said suspensions so as to control the vehicle attitude, the improvement of said system comprises:

hysteresis width changing means responsive to said vehicle speed signal for changing said predetermined hysteresis width based on the magnitude of said vehicle speed, said predetermined hysteresis width being set wider as said vehicle speed becomes larger.

* * * * *